Nov. 3, 1936.   E. HOLECEK   2,059,869
ANTENNA FOR AUTOMOBILES
Filed June 18, 1935
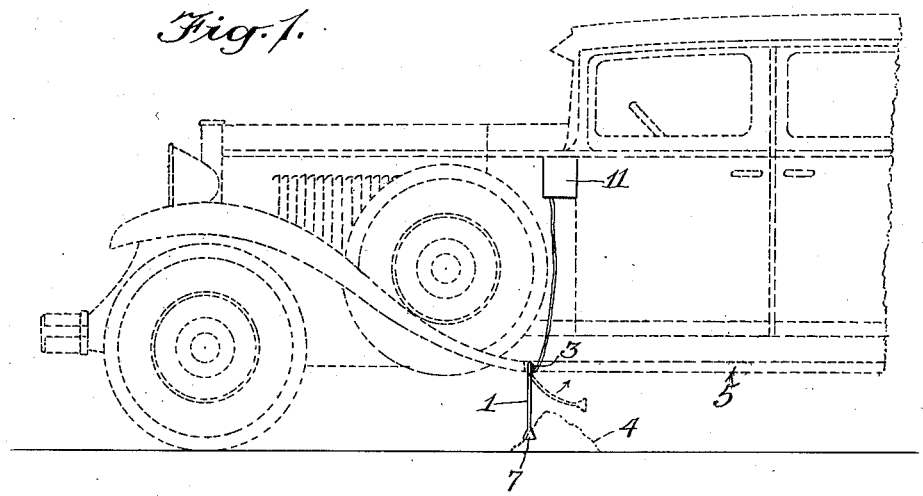
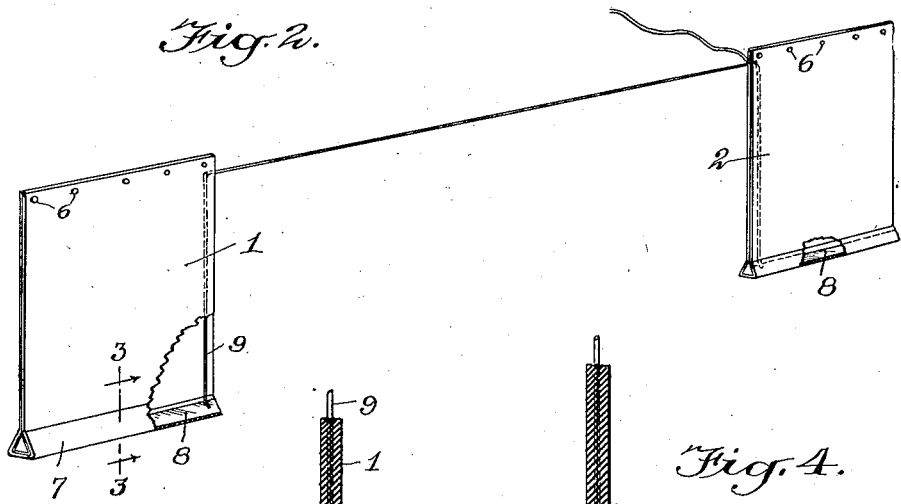
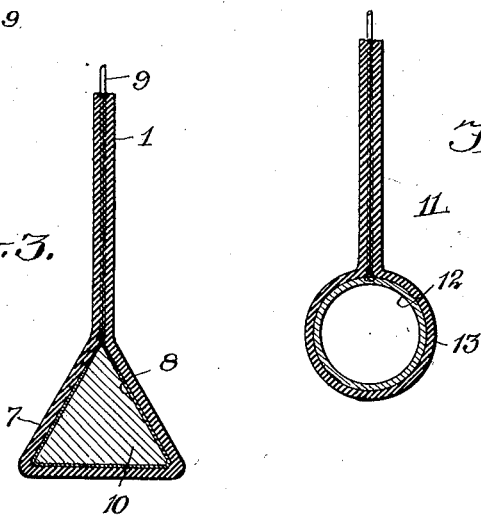
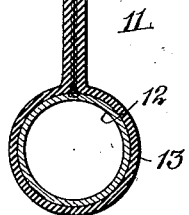
WITNESSES
INVENTOR
Edward Holecek
BY
ATTORNEYS Patented Nov. 3, 1936

2,059,869

UNITED STATES PATENT OFFICE 2,059,869

ANTENNA FOR AUTOMOBILES

Edward Holecek, Algona, Iowa

Application June 18, 1935, Serial No. 27,266

1 Claim. (Cl. 250—33)

This invention relates to antennae and particularly to an improved antenna especially adapted for automobiles, an object being to provide a construction which may be readily applied to an automobile and which will produce an efficient antenna structure so that a radio carried by the automobile may receive the proper volume of the various matters being broadcast.

Another object of the invention is to provide a radio antenna which is swingably mounted on the running board, mudguard, or other part of the automobile so that the lower end will normally be close to the ground and thereby make use of capacity effect with the ground.

A further object more specifically is to provide a radio antenna which may be substantially concealed and yet supported by the automobile normally near the ground.

In the accompanying drawing—

Figure 1 is a side view in dotted lines of the front part of an automobile with an embodiment of the invention applied thereto;

Fig. 2 is a perspective view of the invention in an enlarged scale, certain parts being broken away for disclosing certain detail structures;

Fig. 3 is an enlarged fragmentary sectional view through Fig. 2 on the line 3—3;

Fig. 4 is a view similar to Fig. 3 but disclosing a modified form of the invention.

Referring to the accompany drawing by numerals, 1 and 2 indicate supports which may be rubber or other flexible material. These supports should also be formed of insulating material and preferably of material that is not only flexible but slightly elastic whereby the supports may normally remain vertical but will readily move when considerable air pressure is applied thereto or when the same strikes an obstacle.

As shown in Fig. 1, the support 1 is secured by nails or other means 3 to part of the running board, though it could be secured to the mud guard or other part of the automobile. When an obstacle, as, for instance, the obstacle 4 is encountered, the support 1 will swing to one side and it may even swing upwardly so as to lie flat against the under surface of the running board 5. As the supports 1 and 2 are identical, a description of one will apply to both.

As shown particularly in Figs. 1 and 2, the support 1 is not only provided with apertures 6 for receiving the nails or other securing means 3, but it is provided with a hollow portion 7 in which is mounted a hollow metallic member 8. This member is naturally an electrical conductor and may be made from copper or other metal. A lead out wire or other conductor 9 is electrically connected with the hollow member 8, which is shown triangular in shape in cross section though it may be some other shape without departing from the spirit of the invention. The lead out wire is not only electrically connected with the hollow metallic member 8 but extends upwardly to near the upper edge of the support 1 and then over to near the upper edge of the support 2 and downwardly through the support 2 into electrical engagement with the hollow member 8 of support 2. In order to stiffen and brace the various parts, a filling 10 is arranged in the hollow metallic member 8, said filling being wood or other suitable material.

By providing the hollow metallic member 8 and positioning the same transversely of the automobile, an antenna formation is provided which utilizes ground capacity whereby ample impulses are fed to the radio apparatus 11.

In Fig. 4 a modified form of the device is disclosed wherein a metal pipe or tube 12 is presented and surrounded by an insulating sleeve 13 which is really an extension of the support 14. The pipe 12 is shown empty though it could be filled with wood or other material. Preferably, however, the pipe 12 is made sufficiently thick and heavy to secure the desired weight to hold the support in an almost vertical position unless the automobile is running at a very high speed.

It will be understood that as the automobile moves along the air pressure will naturally act on the respective supports and swing the same upwardly more or less. When the automobile is moving at an average speed, these members or supports swing upwardly only a short distance so that the relative positions of the parts are maintained to a greater or less extent, while presenting a structure which may be swung out of the way or against the running board 5 when the automobile is running at excessively high speed or when an obstacle is engaged by one of the supports.

I claim:

A radio antenna for automobiles, comprising a flat support of flexible insulation approximately as wide as the running board of the automobile and of a length to extend from the running board to a few inches from the ground, means for securing said support to said running board so as to depend therefrom, said support being formed with a lower edge portion hollow for its full width, a metallic member positioned in said hollow lower edge and acting in the double capacity of an antenna member and a weight tending to hold said support in a vertical position, and a lead out conductor extending from said metallic member to the top of said support.

EDWARD HOLECEK.